United States Patent
Wu (10) Patent No.: US 6,877,684 B2
(45) Date of Patent: Apr. 12, 2005

(54) GRINDING TOOL

(75) Inventor: Hua-Te Wu, Tainan (TW)

(73) Assignee: Yienn Lih Enterprise Co., Ltd., Tainan (TW)

( * ) Notice: Subject to any disclaimer, the term of this patent is extended or adjusted under 35 U.S.C. 154(b) by 82 days.

(21) Appl. No.: 10/628,333

(22) Filed: Jul. 29, 2003

(65) Prior Publication Data

US 2005/0023389 A1 Feb. 3, 2005

(51) Int. Cl.[7] .......................... A02D 34/90; A47J 42/00; A47J 43/00
(52) U.S. Cl. ..................... 241/169.1; 241/168; 241/169
(58) Field of Search ................................ 241/168, 169, 241/169.1

(56) References Cited

U.S. PATENT DOCUMENTS

| | | | | |
|---|---|---|---|---|
| 4,343,437 A | * | 8/1982 | Czelen ..................... | 241/169.1 |
| 4,374,574 A | * | 2/1983 | David ..................... | 241/169.1 |
| 5,082,190 A | * | 1/1992 | Chen ...................... | 241/169.1 |
| 6,533,199 B2 | * | 3/2003 | Wu ......................... | 241/169.1 |
| 6,616,076 B2 | * | 9/2003 | Wong ....................... | 241/168 |
| 2004/0069881 A1 | * | 4/2004 | Arduini ................... | 241/169.1 |

* cited by examiner

Primary Examiner—Allen Ostrager
Assistant Examiner—Jason Y Pahng
(74) Attorney, Agent, or Firm—Rosenberg, Klein & Lee (57) ABSTRACT

A grinding tool operable with single hand includes a housing capable of standing upright, a lever, a one-way mechanism, and a grinding mechanism; the lever has an inner end formed with gear teeth, and is pivoted to the housing, and biased outwardly of the housing by a spring to be capable of being pushed and released repeatedly; the one-way mechanism has an actuating gear engaging the inner end of the lever, and a one-way bearing; the actuating gear is engaged with the bearing for causing angular displacement of the bearing together with it only when it is turned in a first direction by means of pushing the lever inwardly of the housing; the grinding mechanism includes an inner wheel turnable together with the bearing, and a stationary outer wheel around the inner wheel so that the contents can be ground between the wheels when the lever is pushed and released repeatedly.

6 Claims, 10 Drawing Sheets

GRINDING TOOL

BACKGROUND OF THE INVENTION

1. Field of the Invention

The present invention relates to a grinding tool, more particularly one, which is made for use in an upright position according to ergonomics principles so as to be relatively easy to take hold of, convenient and easy to use, and capable of grinding the contents thereof more smoothly.

2. Brief Description of the Prior Art

Figure 10:
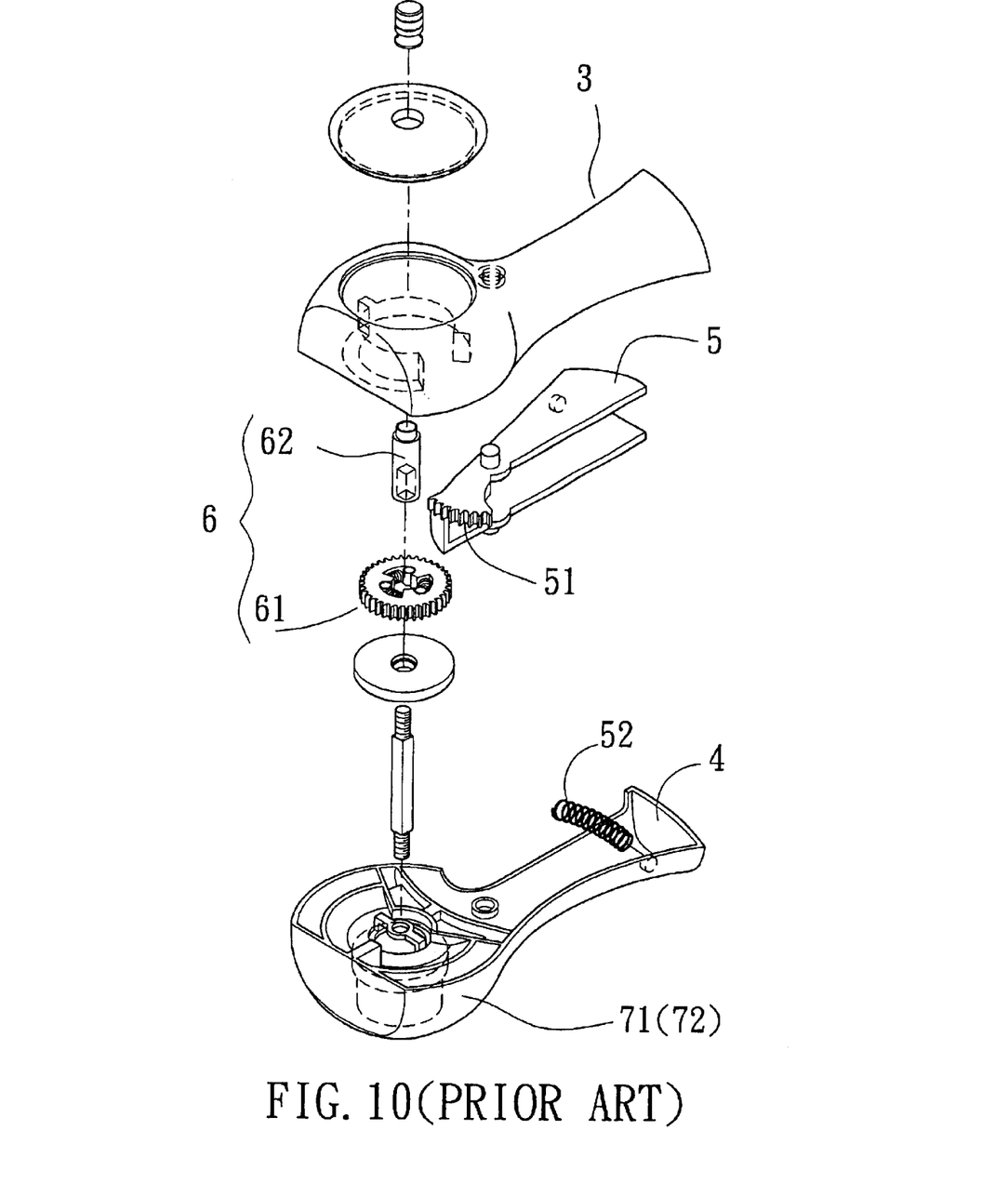

Referring to FIG. 10, a prior grinding tool was disclosed on a patent application, "PEPPER GRINDING TOOL WITH A SIDEWAYS LEVER OPERATED WITH ONE HAND" with application Ser. No. 09/948,911, with U.S. Patent and Trademark Office by the inventor of the present invention.

The grinding tool includes a housing, a lever, a one-way member, and a grinding assembly.

The housing includes an upper housing part 3 and a lower housing part 4 joined to the upper housing part 3; the upper and the lower housing parts 3 and 4 each has a first portion, and a second elongated portion projecting sideways from the first portion; the second elongated portions of the housing parts form a lateral opening between them.

The lever 5 has teeth 51 on a front end, and is pivoted to the housing at an intermediate portion thereof with the teeth 51 facing the first portions of the upper and the lower housing parts 3 and 4, and with a rear portion thereof being biased outwardly of the lateral opening of the housing by a first spring 52 connected to both the lever 5 and one of the second portions of the housing parts 3 and 4.

The one-way member 6 is received in angularly displaceable manner in the first portions of the housing. The one-way member 6 has a round main body 61 having teeth on an outer side abutting the teeth 51 of the lever 5. The main body 61 is connected in selectively engaged manner to a tube 62; the main body 61 will be engaged with the tube 62 for angular displacement therewith in a first direction responsive to the lever 5 being pushed inwardly of the second portions of the housing parts 3 and 4; the main body 61 will be disengaged from the tube 62 for angular displacement relative thereto in a second direction opposing the first direction responsive to the lever 5 being reversibly displaced from the pushed position by means of the spring 52.

The grinding assembly includes an outer grinding element 71 secured in the first portion of the lower housing part 4, and an inner grinding element 72 received in angularly displaceable manner in the outer grinding element 71. The inner grinding element 72 is connected to a lower end of the tube 62 so as to turn relative to the outer grinding element 71 when the elongated portion of the housing is held in a laid down horizontal position with one hand, and the lever 5 is pushed inwardly of the second portion of the housing and released repeatedly.

The grinding tool is found to have disadvantages as followings:

1. Because the grinding tool can only be put away in a laid down position, the outer end of the elongated portion of the housing is prone to be undesirably made to touch the table when the grinding tool is put on the table. Consequently, it is not convenient for the user to take hold of the grinding tool from the laid down position.
2. The user is likely to have a sore wrist after having been operating the grinding tool for extended period of time because he has to operate the tool while holding it in a laid down position.
3. Pepper corns contained in the housing have to pass through the one-way member before they pass into the grinding assembly, and in turns, working of the one-way member will be made less smooth by the pepper corns.

SUMMARY OF THE INVENTION

It is a main object of the present invention to provide a single-hand operated grinding tool to overcome the above disadvantages.

The grinding tool includes a housing capable of standing upright on the table, a lever, a one-way mechanism, and a grinding mechanism. The one-way mechanism has a actuating gear engaged with a toothed end of the lever, and a one-way bearing; the actuating gear is engaged with the one-way bearing for angular displacement of the bearing together with it only when it is turned in a first direction by means of pushing the lever inwardly of the housing. The grinding mechanism includes an inner wheel turnable together with the bearing, and a stationary outer wheel around the inner wheel so that the contents can be ground between the wheels when the housing is held in substantially upright position, and when the lever is pushed and released repeatedly.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
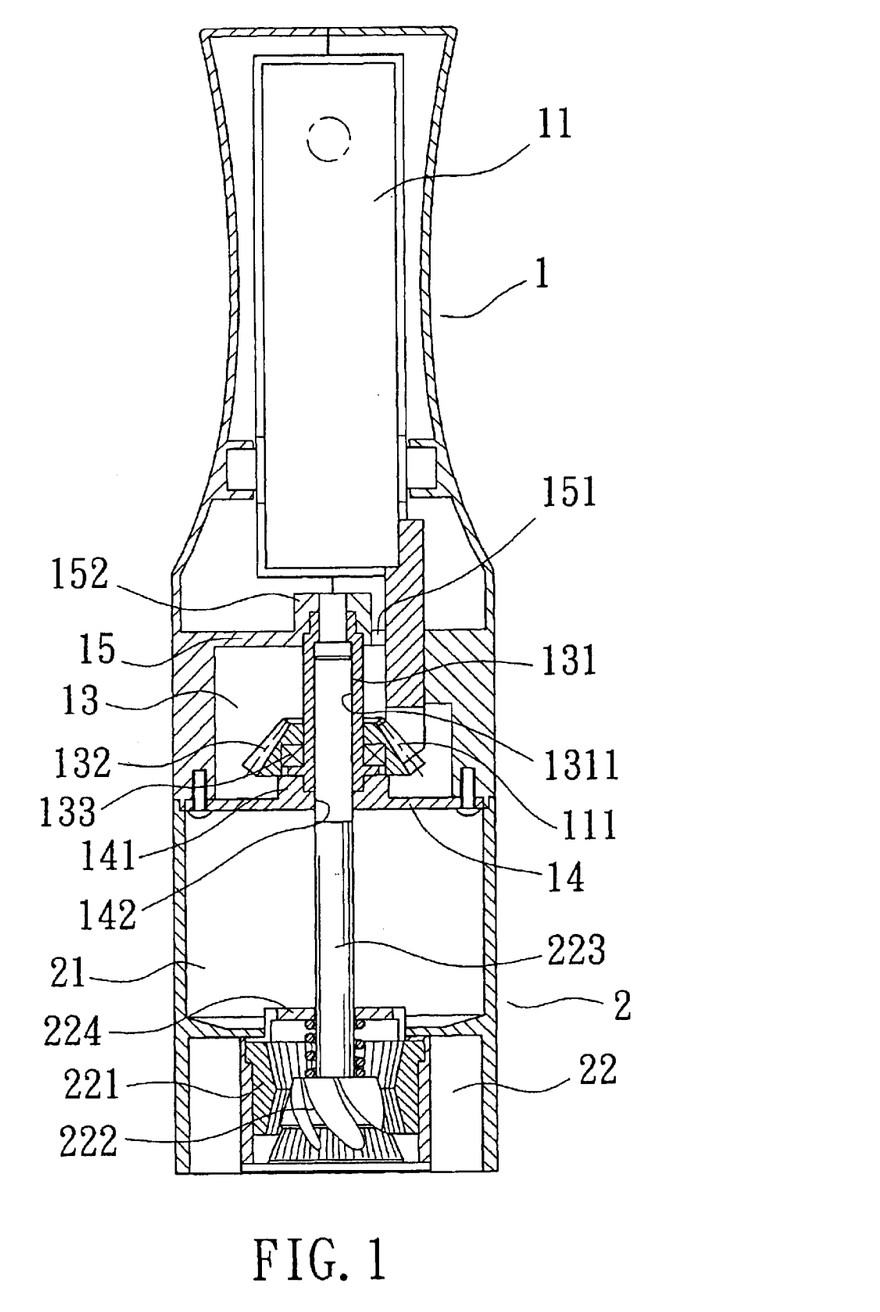
FIG. 1 is a vertical section of the grinding tool according to the present invention.
Figure 2:
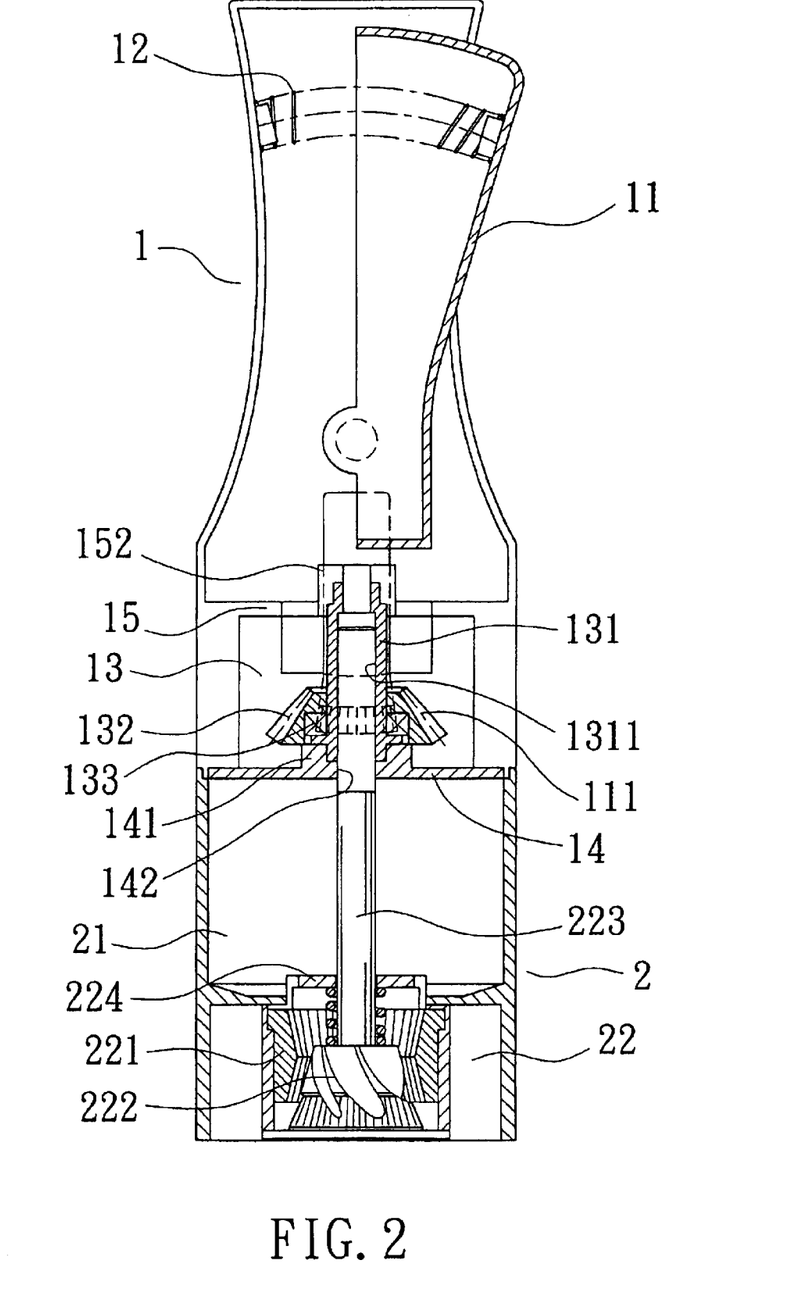
FIG. 2 is another vertical section of the grinding tool according to the present invention.
Figure 3:
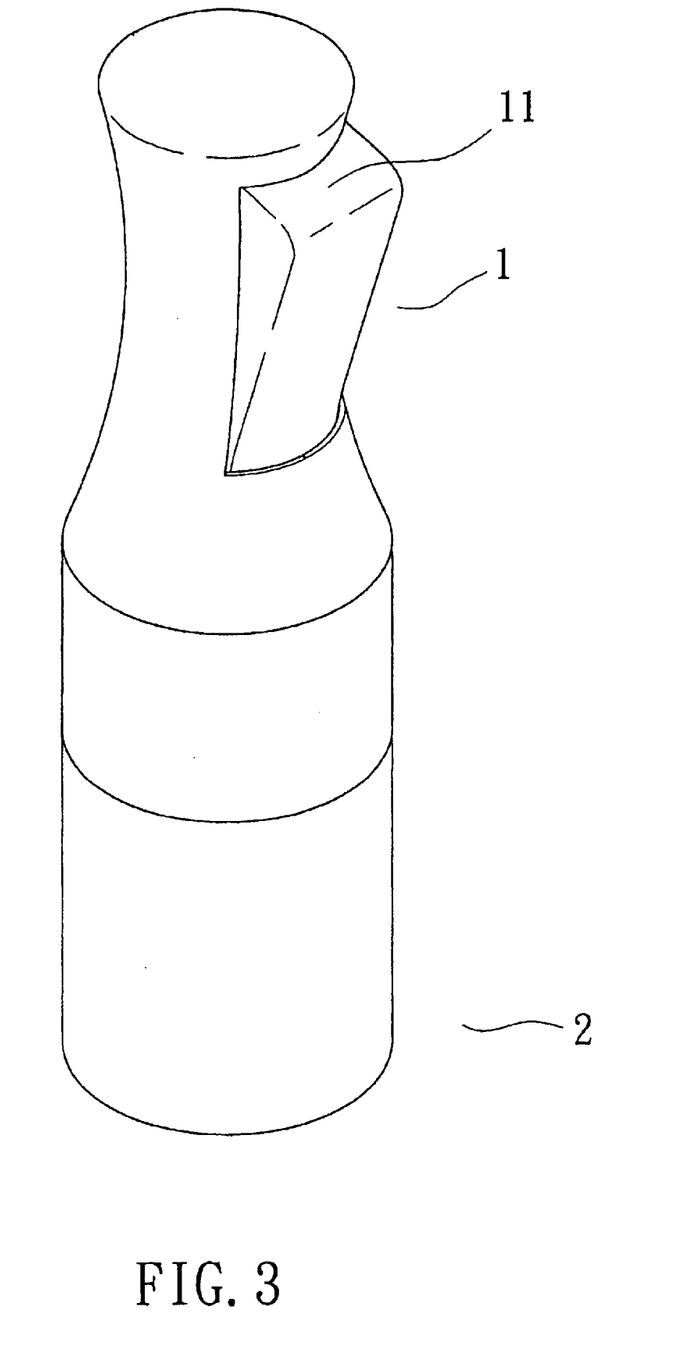
FIG. 3 is a perspective view of the grinding tool according to the present invention.
Figure 4:
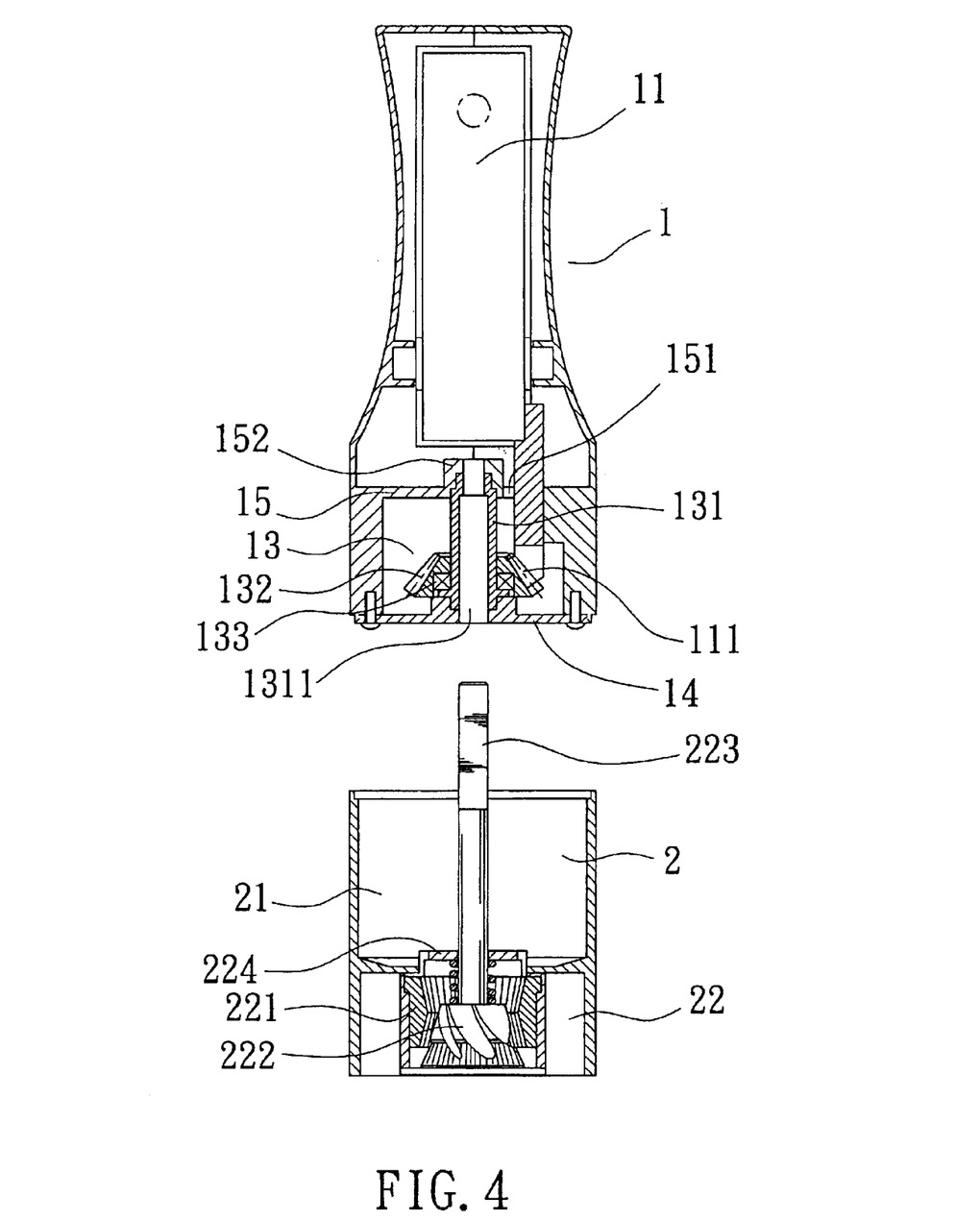
FIG. 4 is a vertical cross-sectional view of the upper and the lower bodies of the present grinding tool, separated from each other.

Referring to FIG. 1, a preferred embodiment of a grinding tool in the present invention includes a housing, a lever 12, a one-way mechanism 13, and a grinding mechanism 22.

The housing includes an upper body 1, and a lower body 2 releaseably joined to a lower end of the upper body 1. The upper body 1 has an elongated upper portion, and a transverse separating board 15 fixedly disposed in a lower portion. The board 15 has an annular holding projection 141 formed on the middle, and an elongated hole 151 formed thereon. The upper body 1 has a transverse locating board 14 fixedly disposed under the transverse separating board 15.

The board 14 has an annular holding projection 141 formed on the middle thereof. The lower body 2 has a transverse locating portion 224 fixedly disposed therein, a holding room 21 above the transverse locating portion 224, and a lower room under the locating portion 224 for receiving the grinding mechanism 22 therein. The locating portion 224 is formed in such a manner that pepper corns in the holding room 21 can fall into the grinding mechanism 22. To load the grinding tool with pepper corns, the upper body 1 is separated from the lower body 2, and pepper corns are put into the holding room 21 of the lower body 2.

The lever 11 is pivoted to the upper body 1 at an intermediate portion thereof. An elastic element 12 is connected to both an upper end of the lever 11 and an upper end of the upper body 1 to bias the lever upper end away from the upper end of the upper body 1. The lever 11 is passed through the elongated hole 151 of the separating board 15 at a lower end. The lower end of the lever 11 has a sector-shaped lower end 111, which is formed with gear teeth.

The one-way mechanism 13 includes a tube 131, an actuating gear 132 in the form of a bevel gear, and a one-way bearing 133, and is received in between the boards 14 and 15 of the upper body 1; the one-way bearing 133 is connected in selectively engaged manner to an annular inner side of the actuating gear 132. In other words, the bearing 133 will turn together with the actuating gear 132 when the actuating gear 132 is turned in a first direction by means of pushing the lever 11 close to the upper end of the upper body 1 and then releasing the lever 11 repeatedly, but the bearing 133 won't turn together with the gear 132 when the actuating gear 132 is turned in a second direction opposite to the first direction by means of releasing the lever 11 from the pushed position. The tube 131 is securely connected to an annular inner side of the one-way bearing 133, and is passed into the annular holding projections 152 and 141 at two ends so as to be rotary between the boards 15 and 14. The tube 131 further has an axial hole 1311, which is formed with a polygonal cross-section.

The grinding mechanism 22 is received in the lower room of the lower body 2, and includes an outer grinding wheel 221 secured in position, an inner grinding wheel 222 received in angularly displaceable manner in the outer grinding wheel 221, and a spring disposed between the locating portion 224 and the inner wheel 222. A transmission shaft 223 is connected to the inner grinding wheel 222. The shaft 223 is formed with a square cross-section at an upper end, and is passed into the axial hole 1311 of the tube 131. Thus, rotation of the tube 131 can be passed on to the inner grinding wheel 222 via the shaft 223, and the inner grinding wheel 222 will turn relative to the outer grinding wheel 221 in single direction to grind the contents of the lower body 2 between it and the outer wheel 221 when the upper body 1 of the housing is held upright with one hand, and the lever 11 is pushed close to the upper end of the upper body 1 and released repeatedly.

Figure 5:
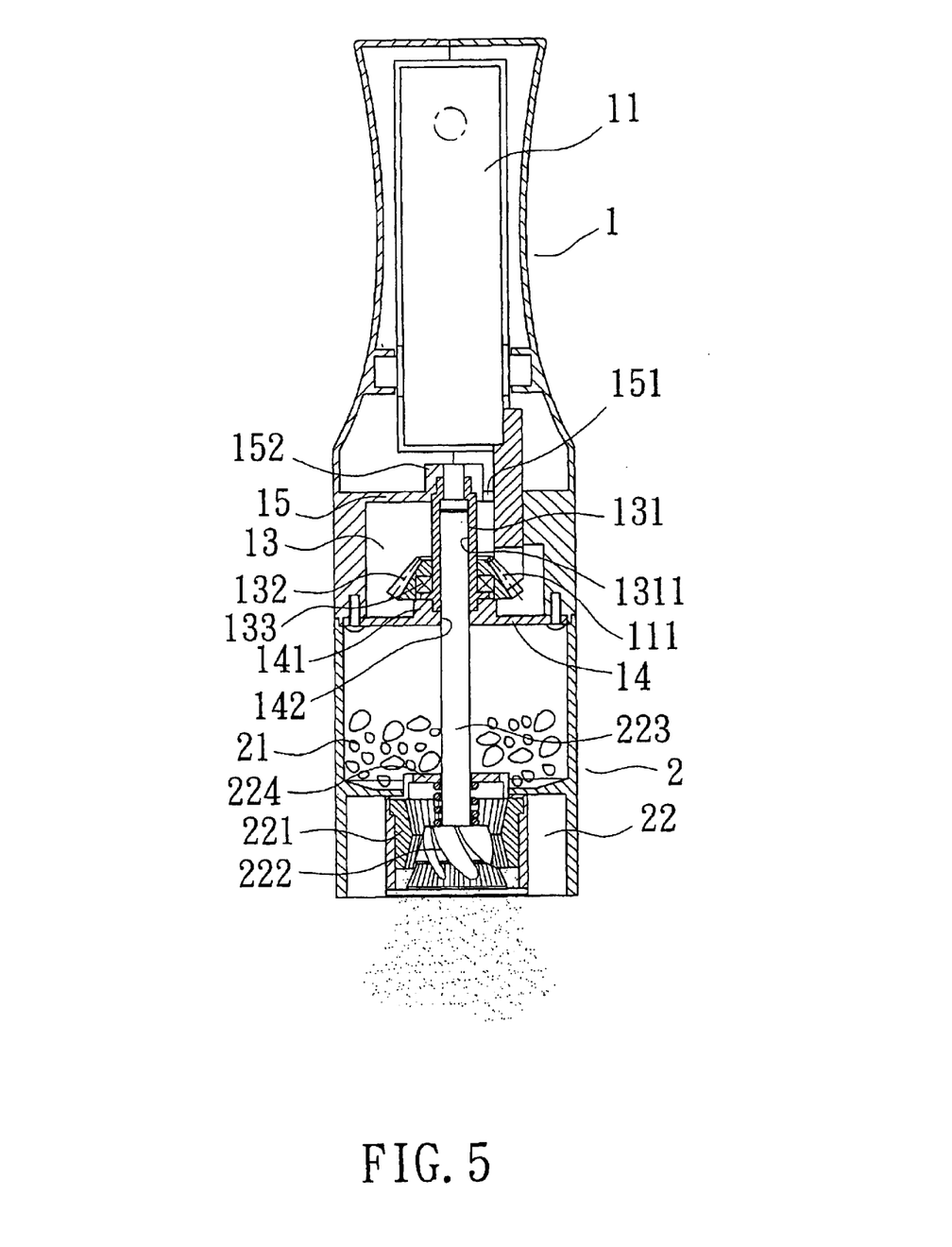
FIG. 5 is a view showing the operation of the grinding tool according to the present invention.
Figure 6:
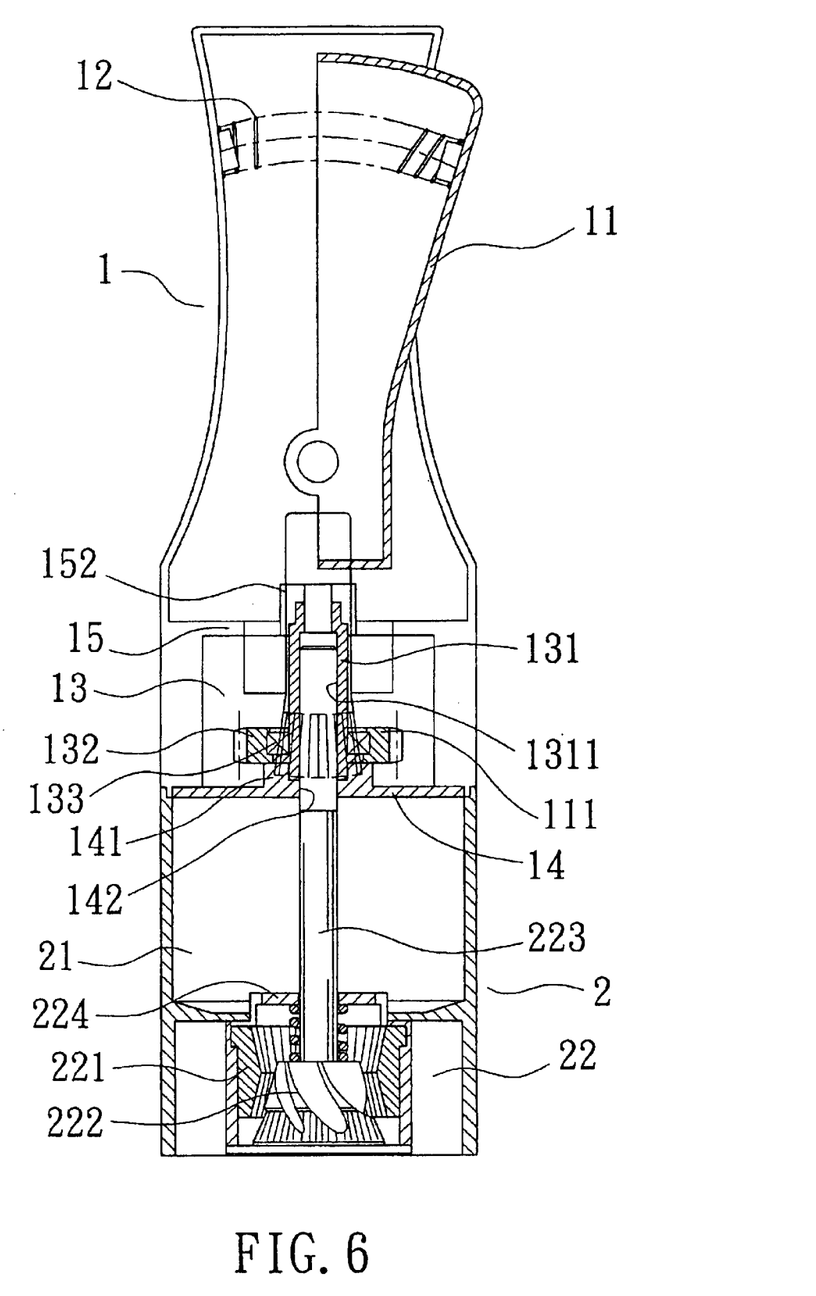
FIG. 6 is a vertical section of the grinding tool in the second embodiment.
Figure 7:
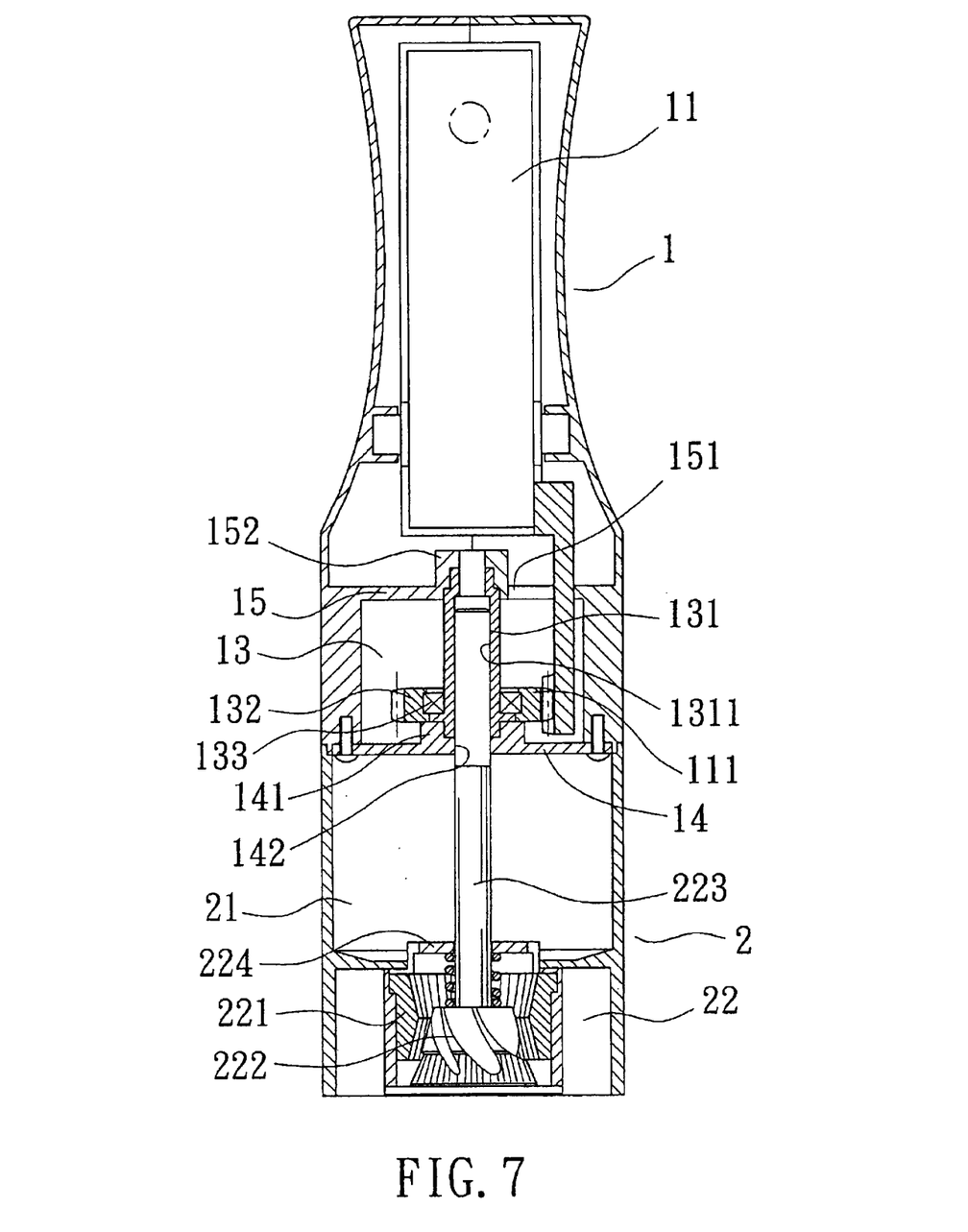
FIG. 7 is another vertical section of the grinding tool in the second embodiment.

Referring to FIGS. 5, and 6, actuating gear 132 can be a face gear instead of a bevel gear according to the second embodiment.

Figure 8:
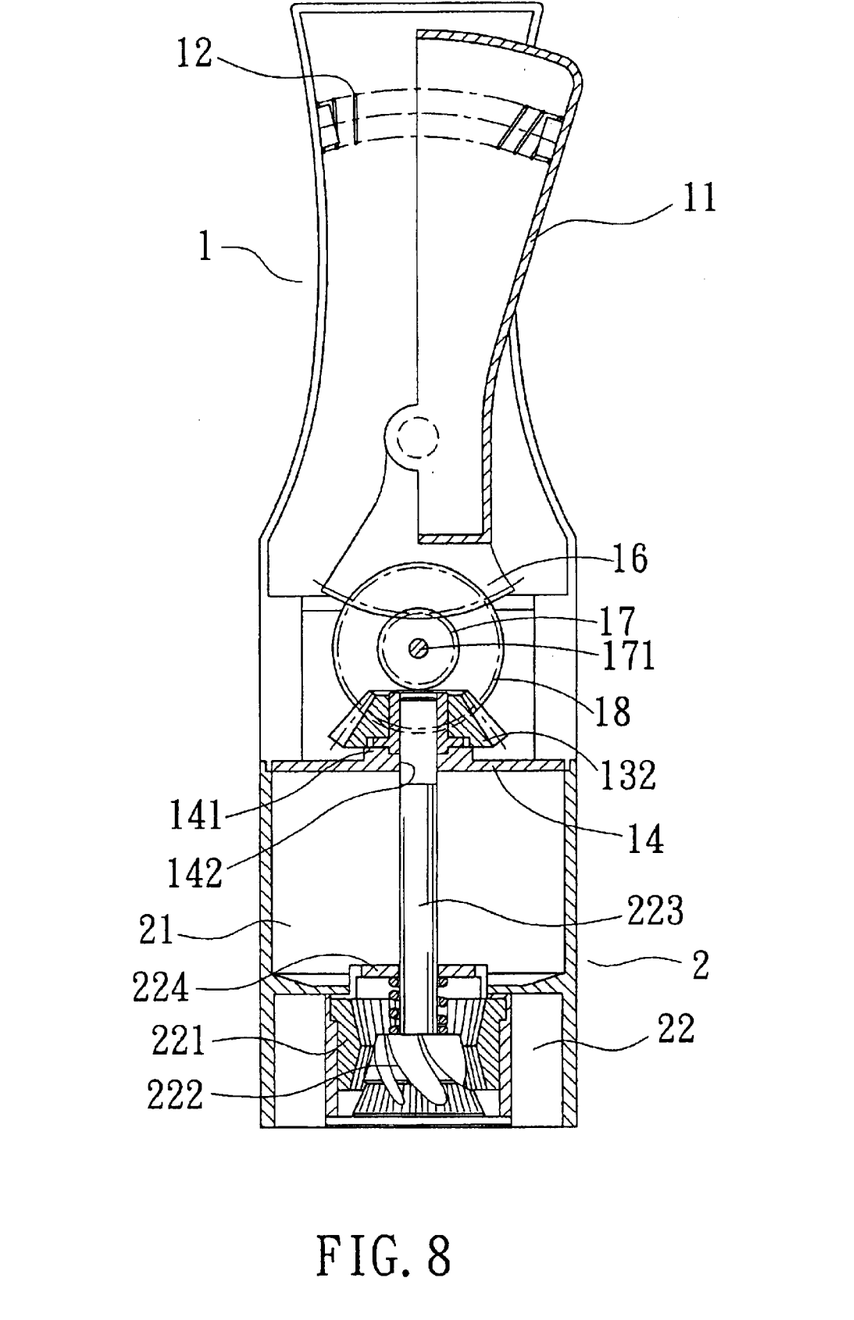
FIG. 8 is a vertical section of the grinding tool in the third embodiment.
Figure 9:
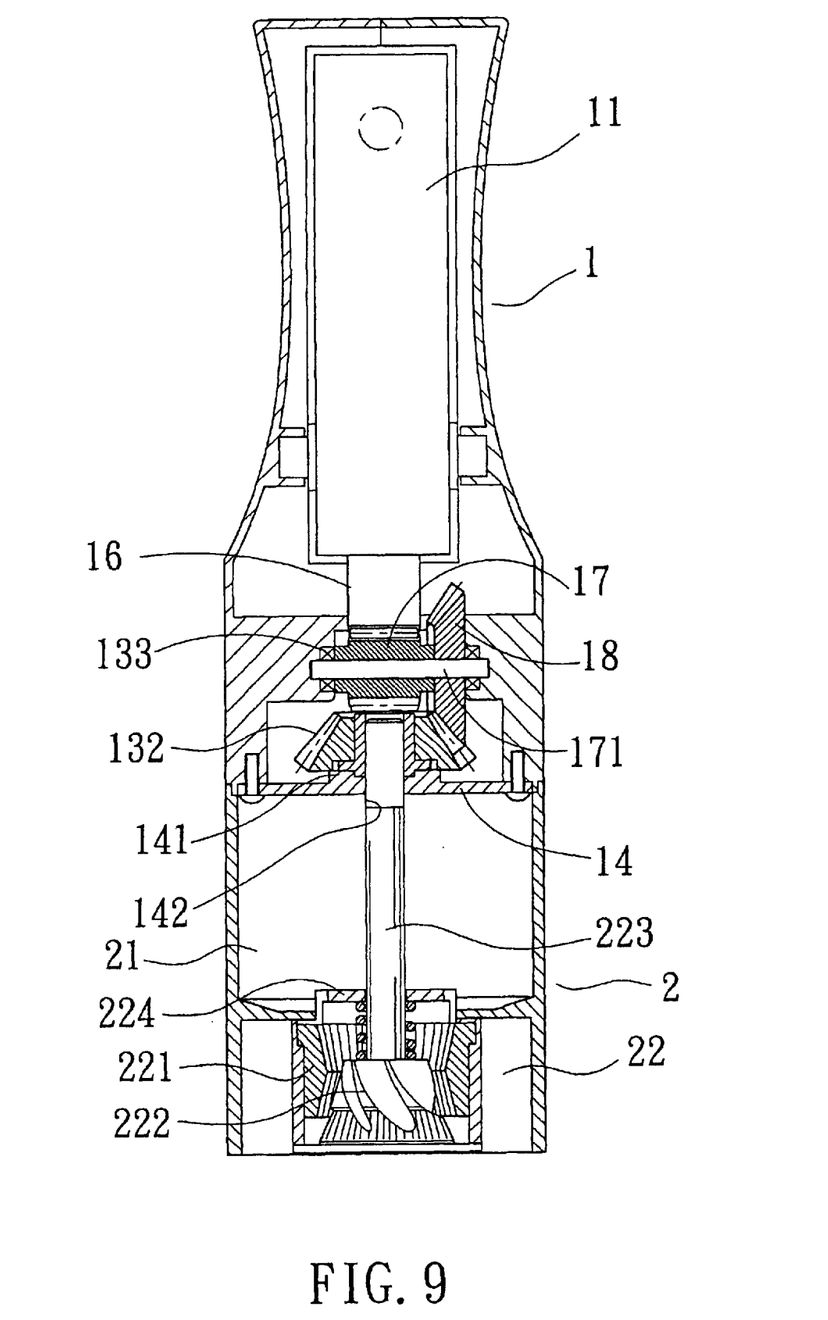
FIG. 9 is another vertical section of the grinding tool in the third embodiment, and FIG. 10 an exploded perspective of the prior grinding tool as described in the Background.

Referring to FIGS. 8, and 9, the lever 11 is formed with a curved lower end 16 instead, which has spur gear teeth thereon, while a spur gear 17 is arranged in the upper body 1 of the housing, and engages the spur gear teeth of the curved lower end 16. And, the spur gear 17 has a central shaft 171, which is fitted into one-way bearings 133 at two ends thereof, and which is passed through, and fixed to a bevel gear 18. The bevel gear 18 engages the actuating gear 132 so that rotation thereof can be passed on to the actuating gear 132. Thus, the grinding tool of the third embodiment can work in the same way as the above embodiments.

From the above description, it can be easily understood that the grinding tool of the present invention has advantages as followings:

1. Because the grinding tool can be put away on the table in an upright position when it is not used, it is relatively easy and convenient for a user to take hold of the grinding tool again.
2. The user operates the grinding tool when holding the tool in the upright position therefore he is less likely to have a sort wrist after having been operating the tool for extended period of time.
3. Pepper corns are contained in the lower body therefore they won't pass into the one-way mechanism 13 to hinder smooth working of the one-way mechanism.

What is claimed is:

1. An improvement on a grinding tool, comprising
   a housing includes an upper body and a lower body releaseably joined to a lower end of the upper body;
   a lever having a sector-shaped lower end formed with gear teeth; the lever being pivoted to the upper body at an intermediate portion thereof; an upper end of the lever being biased away from an upper end of the upper body by a first elastic element connected to both the lever and the upper body;
   a one-way mechanism received in angularly displaceable manner in the upper body of the housing; the one-way member having an actuating gear abutting the gear teeth of the lever; the one-way mechanism having a one-way bearing connected to an annular inner side of the actuating gear; the one-way mechanism having a tube securely connected to an annular inner side of the one-way bearing; the actuating gear being engaged with the one-way bearing for angular displacement therewith in a first direction responsive to the lever being pushed close to the upper end of the upper body; the actuating gear being disengaged from the one-way bearing for angular displacement relative thereto in a second direction opposing the first direction responsive to the lever being reversibly displaced from the pushed position by means of the first elastic element; and
   a grinding mechanism including an outer grinding wheel secured in a lower end of the lower body of the housing, and an inner grinding wheel received in angularly displaceable manner in the outer grinding wheel; the inner grinding wheel being connected to a lower end of the tube so as to turn relative to the outer grinding wheel to grind contents of the lower body therebetween when the housing is held substantially upright with one hand, and the lever is pushed close to the upper end of the upper body and released repeatedly.

2. The grinding tool as claimed in claim 1, wherein the upper body of the housing has a transverse separating board in a lower end portion, and a transverse locating board under the transverse separating board; the boards having annular holding projections formed on middles thereof; the tube of the one-way mechanism being passed into the annular holding projections at two ends thereof.

3. The grinding tool as claimed in claim 1, wherein the tube of the one-way mechanism has an axial hole formed with a polygonal cross-section while a transmission shaft is connected to the inner grinding wheel, and the tube at lower and upper ends thereof respectively; the upper end of the transmission shaft being formed with a square cross-section, and passed into the axial hole of the tube.

4. The grinding tool as claimed in claim 1, wherein the actuating gear is a bevel gear.

5. The grinding tool as claimed in claim 1, wherein the actuating gear is a face gear.

6. The grinding tool as claimed in claim 1, wherein the lever is formed with a curved lower end instead, which has spur gear teeth thereon, while a spur gear is arranged in the upper body of the housing, and engages the spur gear teeth of the curved lower end of the lever; the spur gear having a central shaft fitted into one-way bearings at two ends thereof; the central shaft being passed through, and fixed to a bevel gear; the actuating gear being engaged with the bevel gear instead.

* * * * *